United States Patent
Hedlund et al.

(10) Patent No.: US 10,518,413 B2
(45) Date of Patent: Dec. 31, 2019

(54) INDUSTRIAL ROBOT AND METHOD FOR CONTROLLING THE ROBOT TO AUTOMATICALLY SELECT WHICH PROGRAM CODE TO BE EXECUTED NEXT

(71) Applicant: ABB Schweiz AG, Baden (CH)

(72) Inventors: Annika Hedlund, Västerås (SE); Ivan Lundberg, Västerås (SE); Jonathan Styrud, Västerås (SE); Martin Nordvall, Västerås (SE); Ralph Sjöberg, Västerås (SE); Tomas Groth, Västerås (SE)

(73) Assignee: ABB Schweiz AG, Baden (CH)

( * ) Notice: Subject to any disclaimer, the term of this patent is extended or adjusted under 35 U.S.C. 154(b) by 54 days.

(21) Appl. No.: 15/777,773

(22) PCT Filed: Dec. 11, 2015

(86) PCT No.: PCT/EP2015/079438
§ 371 (c)(1),
(2) Date: May 21, 2018

(87) PCT Pub. No.: WO2017/097377
PCT Pub. Date: Jun. 15, 2017

(65) Prior Publication Data
US 2018/0345494 A1    Dec. 6, 2018

(51) Int. Cl.
*B25J 9/16*    (2006.01)
*G05B 19/42*    (2006.01)

(52) U.S. Cl.
CPC ........... *B25J 9/1664* (2013.01); *B25J 9/1656* (2013.01); *G05B 19/42* (2013.01); *G05B 2219/39453* (2013.01); *G05B 2219/50049* (2013.01)

(58) Field of Classification Search
CPC ...... B25J 9/1664; B25J 9/1656; B25J 9/1679; B25J 9/1602; G05B 2219/39453; G05B 2219/50049
See application file for complete search history.

(56) References Cited

U.S. PATENT DOCUMENTS

| 4,831,232 A | 5/1989 | Andersson et al. |
| 6,313,595 B2 * | 11/2001 | Swanson ............... B25J 9/1679 318/568.11 |

(Continued)

FOREIGN PATENT DOCUMENTS

| EP | 2829366 | 1/2015 |
| WO | 03099526 A1 | 12/2003 |
| WO | 2006059927 A1 | 6/2006 |

OTHER PUBLICATIONS

International Preliminary Report on Patentability Application No. PCT/EP2015/079438 dated Dec. 19, 2017 6 pages.

(Continued)

*Primary Examiner* — Nicholas Kiswanto
(74) *Attorney, Agent, or Firm* — Whitmyer IP Group LLC

(57) ABSTRACT

An industrial robot including a manipulator and a robot control unit are disclosed, wherein the manipulator includes a plurality of joints that are moved under the control of the control unit, and the control unit includes a storage medium including program code for controlling the motions of the robot when executed by the control unit. The control unit is configured to automatically select which part of the program code to be executed next based on the position of the robot. A method for controlling the robot is also disclosed.

14 Claims, 5 Drawing Sheets

(56) References Cited

U.S. PATENT DOCUMENTS

| | | | |
|---|---|---|---|
| 6,408,224 B1* | 6/2002 | Okamoto | B25J 9/1661 29/721 |
| 6,463,360 B1 | 10/2002 | Terada et al. | |
| 7,209,801 B2* | 4/2007 | Anfindsen | B25J 9/1664 318/568.2 |
| 9,880,545 B2* | 1/2018 | Fadlovich | G05B 19/402 |
| 2013/0345874 A1 | 12/2013 | Blumberg et al. | |
| 2017/0160721 A1* | 6/2017 | Gombert | B25J 9/1656 |

OTHER PUBLICATIONS

International Search Report and Written Opinion of the International Searching Authority Application No. PCT/EP2015/079438 Completed: Aug. 22, 2016; dated Aug. 29, 2016 12 pages.

* cited by examiner

INDUSTRIAL ROBOT AND METHOD FOR CONTROLLING THE ROBOT TO AUTOMATICALLY SELECT WHICH PROGRAM CODE TO BE EXECUTED NEXT

TECHNICAL FIELD

The present invention relates to an industrial robot including program code for controlling the motions of the robot, and a method for controlling the robot.

BACKGROUND

An industrial robot comprises a manipulator and a robot control unit for controlling the motions of the manipulator. The manipulator includes a plurality of joints that are moved under the control of the robot control unit. The control unit includes a storage medium for storing robot programs including program code for controlling the motions of the robot when executed by the control unit. The program code comprises a series of robot program instructions written in a robot language. The control unit has a program executor adapted to execute the stored program instructions. The robot can be teached to follow an operating path including a plurality of target points. The robot is taught how to perform a task by being guided through various target points along a desired operating path.

When an industrial robot is stopped due to a failure or intentionally, the robot has to be restarted. During a stop in production it is vital to get back on track with the right task as soon as possible. However, resuming to the current task is not always wanted or even possible. Today, the robot operator can use a portable user interface to the robot, also denoted TPU (Teach Pendant Unit), to switch programs, and to select which task to be executed. The same is true during teaching of the robot and when modifying a robot program, in which cases the user often has to step through the robot program to get to the right target point to be modified.

In a collaborative environment, and for many operators, using the TPU or another HMI in this manner is a slow and unintuitive process. It is a desire to use the TPU and details of the program structure as little as possible.

US20130345874A1 relates to the acquisition, organization, and use of task related information by industrial robots to facilitate performance of tasks in an autonomous manner.

SUMMARY

It is an object of the present invention to at least partly overcome the above problems, and provide a faster and more intuitive way to resume a robot, for example, after stop in production or during teaching of the robot.

This object is achieved by an industrial robot and a method for controlling a robot according to the invention.

The method comprises automatically selecting which part of the program code to be executed next based on the position of the robot, and executing the selected part of the program code.

With the term automatically is meant that the selection is made by a machine, for example, by the robot control unit, and not by a human.

According to the invention, the robot automatically selects which part of the program code to be executed next, based on its current position. The program code may include a plurality of robot programs and/or a plurality of program procedures, and the robot may select to start the execution in one of the robot programs or in one of the program procedures. Which part of the program code being selected depends on where in the working area the robot is positioned. Thus, by moving the robot, preferably by hand, in the working area of the robot, it is possible to select to start the execution in different parts of the program code. The program part may include program code for performing a plurality of tasks. By that it is possible to select which task to run among a plurality of tasks.

The invention provides a method for deciding which part of the robot program code to be executed next, for example, when execution of the current part of the robot program has been stopped. The control unit may then switch to another part of the program code and by that execute another task based on the robot position. The start of execution of the selected program part can be made automatically, but this is not necessarily.

Advantages with the invention are that it is faster and more intuitive to regain the robot after a stop in production, and commissioning becomes faster. Further, the invention can be very useful during teaching of the robot. For example, the user can select to start the execution of the program at a certain target point by moving the robot to a position at or close to the real target point. The user does not need any TPU or another HMI to select which part of the program code to be executed next. The user is, for example, a robot operator.

According to an embodiment of the invention, the method comprises upon command executing the selected part of the program code. Due to safety reasons, the execution of the selected part of the program code is started upon command. This means that execution of a selected program part is not started immediately after it has been selected. The execution of the selected program part has to be initiated in some way. The term "command" should be interpreted in a wide sense, and can, for example, be an external input signal, a timeout, detection of an event, or an input from the user. For example, the command can be an approval from a user. The user is, for example, a robot operator. The user can, for example, send an approval from a HMI. The command can also be an approval based on data from internal robot sensors related to physical user interactions with the robot, such as, the user touching the robot.

Suitably, the method according to the invention is used when the robot has been stopped. However, the method can also be used while the robot is moving.

According to an embodiment of the invention, the method comprises defining a plurality of locations in the surroundings of the robot, each of the locations being assigned a part of the program code, and selecting which part of the program code to be executed next based on the position of the robot and the defined locations. The locations can be defined points, areas or volumes in the vicinity of the robot.

According to an embodiment of the invention, the method comprises determining the closeness between the current position of the robot and the locations, and selecting the program code assigned to the location based on the closeness to the current position of the robot. Which program part to be executed next is selected based on the closeness between the robot position and the locations. For example, the program part associated to the location closest to the current position of the robot is selected, or the program part associated to the location housing the current position of the robot is selected. Thus, a program part can be selected if the robot position is closest to the location, or if the robot position is within the location associated to the program part.

According to an embodiment of the invention, the method comprises detecting that execution of the program code has been stopped, and upon command start execution of the selected part of the program code. For example, the method comprises detecting that the motions of the robot has been stopped, and automatically selecting which part of the program code to be executed when the robot is restarted based on the position of the robot. This embodiment provide a faster and intuitive way to regain the robot when the robot bas been stopped, for example, after stop in production. The stop can be intentionally, or unintentionally due to an error.

According to an embodiment of the invention, the method comprises manually moving the robot to a new position when execution of the current program part has been interrupted, and selecting which part of the program code to be executed next based on the new position of the robot. The user moves the robot to a new position close to or within one of the defined locations. For example, the user moves the robot using a lead-through functionality, jogging of the robot, or other approaches. Thus, the user does not need to enter the program code and move the program pointer in order to select another part of the robot program code to be executed. The user only has to manually move the robot to a location associated with a certain part of the robot program, and the robot automatically selects the part of the robot program associated with the location. This is easy and intuitive for the user.

According to an embodiment of the invention, the robot comprises a stationary base and at least one arm that is rotatable about the stationary base. The user manually moves the arm in relation to the stationary base. The position of the robot can be defined as the position of the arm in relation to the stationary base. According to an embodiment of the invention, the method comprises presenting the result of the selection on a user interface, and executing the selected part of the program code upon receiving an approval from the user. The user interface can, for example, be a display, a touch panel or an audio device. By presenting the result of the selection, i.e. the selected program part, the user is informed about which part of the program will be executed next upon an approval. The user may move the robot around in the working area until the desired program part appears on the user interface. When the desired program part appears on the user interface, the user can send an approval to start execution of the selected program part, for example, via the user interface. Thus, it is not necessary for the user to have knowledge of the program structure to be able to switch to a new part of the program code. If multiple locations are candidates for program part selection, the use can be presented a list of choices for which program execution is possible According to an embodiment of the invention, the program code comprises program code for controlling the robot to perform a plurality of tasks, and the method comprises automatically selecting which task to be executed next based on the position of the robot, and upon command executing the selected task. The method may comprise defining a plurality of locations in the surroundings of the robot, and each of the locations being assigned the program code for performing one of the tasks. Suitably, the locations are robot positions used in the different tasks. Each task can be associated with a robot position used in the task. Which task to execute next is, for example, determined by some kind of measure of closeness between the current robot position and one or more robot positions used in the different tasks. This embodiment makes it easy and intuitive for a user to switch to another task.

According to an embodiment of the invention, the method comprises deciding whether to continue execution of the current task or to execute another of the tasks based on the position of the robot. This embodiment makes it fast and easy for a user to select between resuming the current task or to switch to another task.

According to an embodiment of the invention, the locations include a plurality of defined points, each of the defined points being assigned a part of the program code, and the method comprises determining the closeness between the current position of the robot and the defined points, and selecting which part of the program code to be executed next based on the closeness between the current position of the robot and the defined points. The defined points are preferably Cartesian points located in the vicinity of the robot. The points can be predefined, or being defined during execution of the robot program. For example, the points can be target points on a programmed robot path, and the assigned parts of program code may contain program code defining robot motions for the target points. However, the points can be located anywhere in the working area of the robot. The points can even be located outside the working area of the robot.

According to an embodiment of the invention, the method comprises storing a stop position of the robot when execution of the program code has been interrupted, determining the closeness between the current position of the robot and the stop position of the robot, and selecting which part of the program code to be executed next based on the determined closeness between the current position of the robot, the defined points and the stop position such that the currently executed part of the program code is selected if the position of the robot is closest to the stop position, and otherwise the part of the robot program code assigned to the defined point closest to the position of the robot is selected. This embodiment makes it fast and easy for a user to select between resuming execution of the current program part or to switch to another program part.

According to an embodiment of the invention, the locations includes a plurality of defined zones within the operating range of the robot, and each of the zones being assigned a part of the program code, and the method comprises determining whether the position of the robot is within any of the zones, and selecting which part of the program code to be executed next based on in which of the zones the current position of the robot is located. For example, if the current position of the robot is within one of the zones, the part of the program code assigned to that zone is selected. If the position of the robot is within more than one zone, one of the zones can be selected based on the robot position relative to the center of the zone or based on user input. For example, if the position of the robot is within more than one zone, a selection choice can be presented to the user, e.g. through an HMI. The process could then be stated when the user has allowed it, e.g. either using HMI, by touching the robot, automatically after a timeout or by other means.

For example, pre-configured zones are related to different tasks. For each task, a zone is defined. Preferably, the zone is a volume. The method comprises checking whether the robot is within any of the defined zones, and if the robot is within one of the zones, the task belonging to the zone is selected and proposed to the user. If the user accepts the selected task, the program code for carrying out the task is executed. Alternatively, the execution of the task is automatically started after a timeout if it is detected that the robot is within a defined zone.

According to an embodiment of the invention, the locations are programmed target points on a robot path, and the method comprises letting the user choose whether the robot is to execute the selected target point or to start executing the program code from the beginning. This embodiment is useful during teaching of the robot and when modifying a robot program. The user can easily select from which target point the execution of the program code is to be continued by simply moving the robot to a position close to the desired target point. The user does not have to step through the robot program to get to the right target point, which is to be modified.

The robot comprises a manipulator and a robot control unit. The manipulator includes a plurality of joints that are moved under the control of the control unit, and the control unit includes a storage medium including program code for controlling the motions of the robot when executed by the control unit. According to the invention, the control unit is configured to automatically select which part of the program code to be executed next based on the position of the robot.

According to an embodiment of the invention, the control unit is configured to upon command execute the selected part of the program code.

According to an embodiment of the invention, a plurality of locations in the surroundings of the robot are defined, each of the locations being assigned a part of the program code, and the control unit is configured to select which part of the program code to be executed next based on the position of the robot and the defined locations.

According to an embodiment of the invention, the control unit is configured to select which part of the program code to be executed next when execution of the current program part has been interrupted.

According to an embodiment of the invention, the robot comprises a user interface, and the control unit is configured to present the result of the selection on the user interface, and to execute the selected part of the program code upon receiving an approval from the user. For example, the approval is given via the user interface.

According to an embodiment of the invention, the program code comprises program code for controlling the robot to perform a plurality of tasks, and the control unit is configured to automatically select which task to be executed next based on the position of the robot, and to execute the selected task upon command.

According to an embodiment of the invention, the control unit is configured to select to continue execution of the present task or to execute another of the tasks based on the position of the robot.

BRIEF DESCRIPTION OF THE DRAWINGS

The invention will now be explained more closely by the description of different embodiments of the invention and with reference to the appended figures.

DETAILED DESCRIPTION

Figure 1:
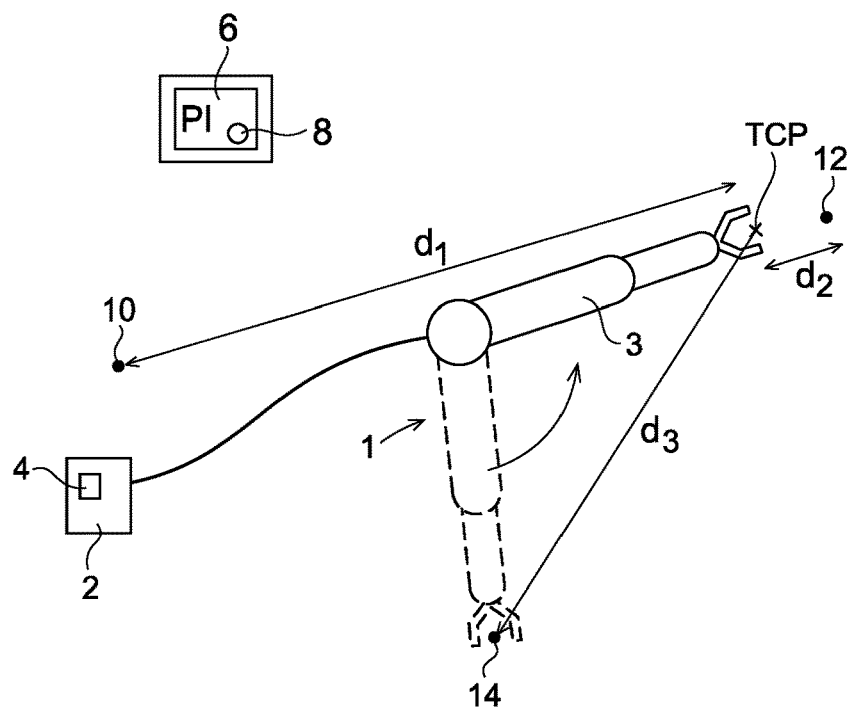
FIG. 1 shows an example of an industrial robot according to the invention.

FIG. 1 shows an example of an industrial robot 1 according to the invention. The robot 1 comprises a robot control unit 2 and a manipulator 3. The manipulator includes a plurality of joints that are moved about a plurality of axes under the control of the control unit. The manipulator is stationary in a defined working area. Thus, the manipulator is not mobile during operation of the robot. In this example, the manipulator 1 has a stationary base and one arm that is rotatable about the stationary base. The arm supports a wrist that is rotatable about a plurality of axes. The wrist supports a tool, in which an operating point, called TCP (Tool Centre Point), is defined.

The control unit includes software as well as hardware, such as input and output means, a processor unit including one or more central processing units (CPU) for handling main functions of the robot controller, such as executing robot programs. The control unit has a storage medium 4 for storing program code for controlling the motions of the manipulator. The robot may also include a user interface 6 to allow communication between the robot and a user, such as a robot operator. The user interface 6 is, for example, a portable operating device for teaching and manually operating the robot. Alternatively, the user interface is a screen with touch functionally, such as a tablet or a cell phone.

According to the invention, the control unit 2 is configured to automatically select which part of the program code to be executed next based on the position of the robot. The program code may comprise program code for controlling the robot to perform a plurality of tasks, and in one embodiment of the invention the control unit is configured to automatically select which task to be executed next based on the position of the robot.

With the position of the robot is meant the position of the manipulator 3 of the robot. The position of the robot can be defined as the position of a prescribed part of the robot, for example, a part of the robot arm. The position of the robot can also be given by the TCP of the robot. The position of the robot can also be given by the positions of a defined set of axes of the robot.

The control unit is configured to select which part of the program code to be executed next based on the current position of the robot and a plurality of locations defined in the vicinity of the robot. Each of the locations is assigned a part of the program code, and it is determined where to start execution of the program code. Which part of the program code to execute next, and accordingly where to start execution of the program code is determined by some kind of measure of closeness between the current robot position and the defined locations, and a defined criteria for the closeness. The criteria is, for example, that the position of the robot is within defined zones, or that the robot is close to defined points. If more than one location fulfills the closeness criteria, more than one program part can be selected and presented to the user with an option to choose which of the selected program parts to be executed next. The chosen program part is then executed. If the criteria is a range, the user may select another program part than what was suggested as a first choice.

Suitably, the control unit is configured to upon command execute the selected part of the program code. For example, the user has to approve the selection before the selected program part is executed e.g. by using the user interface 6, by touching the robot, automatically after a timeout, or by other means. The user interface 6 can, for example, be provided with a touch button 8. The selected part of the program code can be displayed on the user interface 6, and the user can approve the selected program part by interacting with the user interface. The user can also approve the selection by giving a touch command, for example, by tapping on the robot. If the selected part of the program code is a program procedure or a robot program for carrying out a task, the name of the procedure, the robot program or the task can suitably be presented on the user interface. Execution of the selected part of the program code could then be started when the user has approved the selection. If multiple choices fulfill the defined criteria for closeness, a selection choice can be given to the user, e.g. through the user interface 6.

For example, the control unit is configured to select which part of the program code to be executed next when execution of the current program part has been interrupted or when the movements of the robot have been stopped. By supervising the movements of the robot it can be detected that the robot has been stopped.

In one embodiment of the invention, the control unit is configured to select to continue execution of the presently executed part of the program code, or to execute another part of the program code based on the position of the robot. In this embodiment, the control unit also takes into account the possibility to continue execution of the present program code. If the robot is not moved to another location, or only a short distance, after it has been stopped, execution of the current part of the program code is resumed. If the robot instead is moved such that it is closer to one of the defined locations after it has been stopped, a new part of the program code is executed. Thus, the user can choose to resume the present task or to switch to another task. In this embodiment of the invention, the control unit is configured to store a stop position of the robot when execution of the program code has been interrupted, and to select which part of the program code to be executed next based on the defined locations as well as the stop position of the robot. For example, the control unit is configured to determine the closeness between the current position of the robot and the stop position of the robot, and to select which part of the program code to be executed next based on the determined closeness between the current position of the robot and the defined locations, and the closeness between the current position of the robot and the stop position. The control unit is configured to select the currently executed part of the program code if the current position of the robot is closest to the stop position, and otherwise to select the part of the robot code assigned to the location closest to the current position of the robot.

FIG. 1 shows an example of the invention. In this example, two locations 10 and 12 in the form of two points have been defined in the surroundings of the robot. Each of the locations 10 and 12 has been assigned a part of the program code. As an example, the location 10 has been assigned a program procedure P1, and the location 12 has been assigned a program procedure P2. By moving the robot, preferably by hand, to a position in the vicinity of the location 10, procedure P1 is selected. If the robot instead is moved to a position in the vicinity of the location 12, procedure P2 is selected. In this example, the execution of the program code was interrupted when the robot was in the position illustrated by dotted lines. The control unit is configured to store the stop position of the robot when execution of the program code has been interrupted as one of the locations to be considered during the selection. In this example, the stop position is the position of the TCP of the robot when execution of the program code was interrupted and the robot was stopped. The stop position is stored as location 14, and is assigned the part of the program code executed when the robot was stopped. Which program part to select is determined based on the distance between the current position of the robot and the positions of defined locations 10, 12 and 14. The criteria for the selection is, for example, to select the part of the program code assigned to the location closest to the TCP of the robot. As shown in the figure, the distance d2 between the TCP of the robot and the location 12 is less than the distance d1 between the TCP of the robot and the location 10 and the distance d3 between the TCP of the robot and the location 14. Thus, the robot is closest to the location 12 and accordingly the procedure P2 is selected. When the procedure P2 has been selected, the name P2 of the procedure is displayed on the user interface 6. The user can then start execution of procedure P2 by, for example, touching the touch button 8 on the user interface, or by touching the robot. Alternatively, the execution of procedure P2 can be started automatically a certain time after the robot has been moved to the current position. If the closeness criteria fits more than one location, the user may select an alternative location from a list of locations for which the criteria is fulfilled In an alternative embodiment of the invention, a first task could be defined using target points to the left of the robot and a second task could be defined using target points to the right of the robot. By moving the robot, preferably by hand, to the left of the robot, the control unit determines that the first task should be executed. If instead the robot is moved to the right, the control unit determines that the second task should be executed. Which task to execute is determined by some kind of measure of closeness between the current robot position and the target points used in the different tasks.

Figure 2:
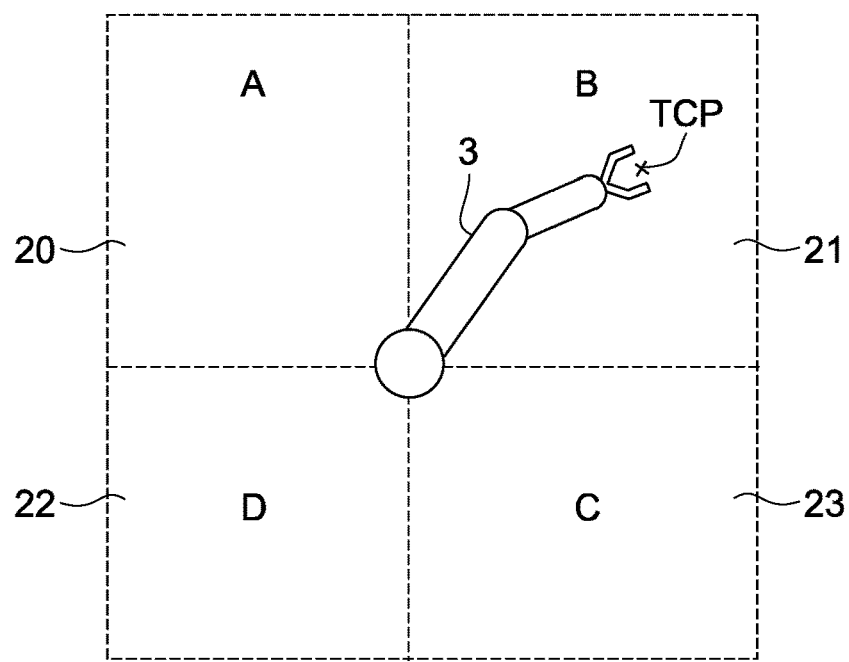
FIG. 2 shows another example of an industrial robot according to the invention.

FIG. 2 shows another embodiment of the invention. In this embodiment of the invention, a plurality of zones is defined within the operating range of the robot and each of the zones being assigned a part of the program code, such as program procedure or programs for carrying out different tasks. The zones can be areas or volumes. The control unit is configured to determine whether the current position of the robot is within any of the zones, and to select to start the execution in the assigned part of the program code upon restart of the robot if the current position of the robot is within one of the zones. In the example shown in FIG. 2, four zones 20-23 are defined. Each of the zones 20-23 is assigned a program part A-D. In FIG. 2, the TCP of the robot is within the zone 21, and accordingly, the program part B is selected as the program part to be executed next. If the user moves the robot to zone 20, the program part A is selected. Thus, the user can select which program part to be executed next by moving the robot to the zone assigned to the desired program part.

Figure 3:
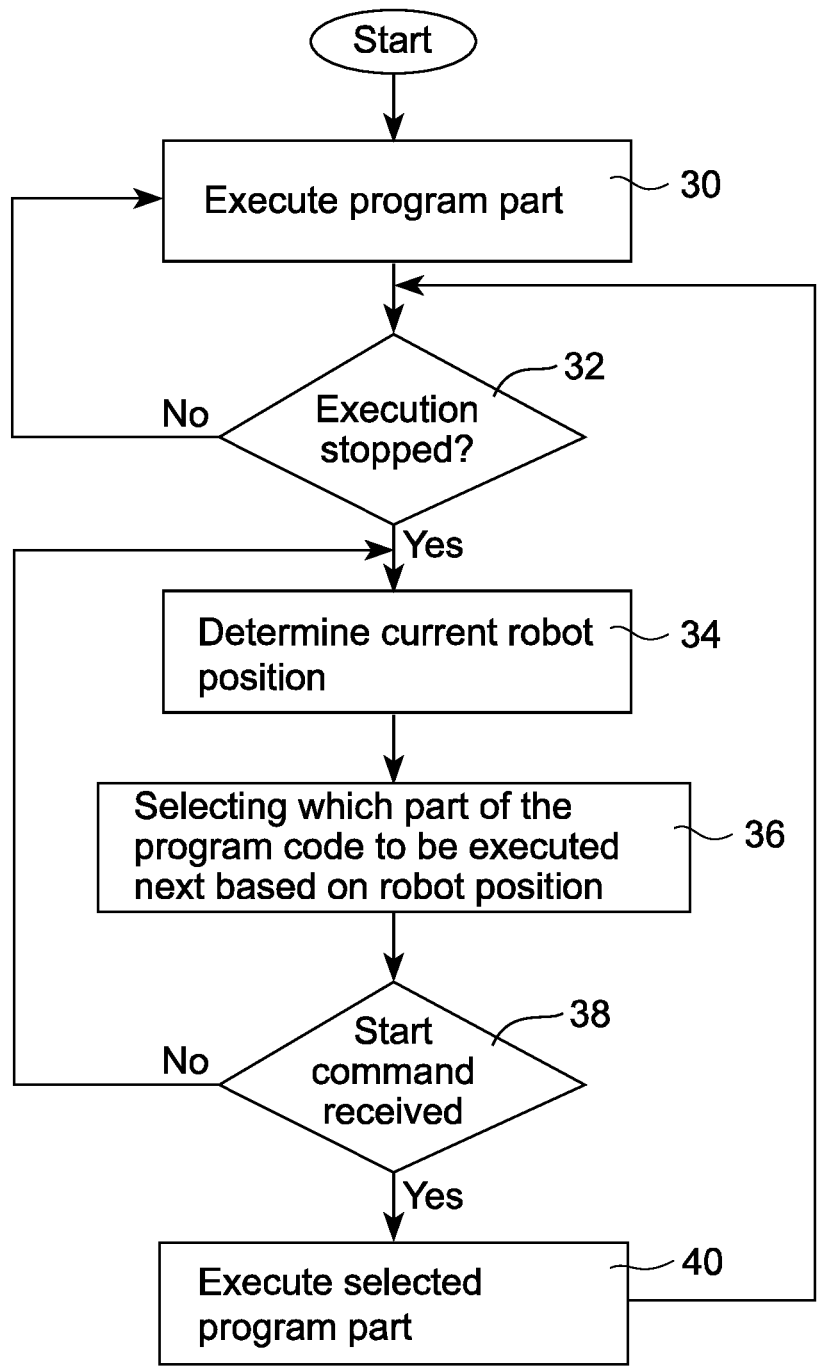
FIG. 3 shows a flow chart of a method according to a first embodiment of the invention.

FIG. 3 shows a flow chart of a method according to a first embodiment of the invention. It will be understood that each block of the flow chart can be implemented by computer program instructions. A part of the robot program is executed, block 30. The execution of the robot program part is continued until the execution is stopped, block 32. The execution can be stopped intentionally or unintentionally. For example, the user may intentionally interrupt the execution of the robot program part. When the execution of the robot program has been stopped, the current position of the robot is determined, block 34. For example, the TCP of the robot is determined based on signals from position sensors of the robot. Which program part to be executed next is selected based on the determined position of the robot, block 36. The selection of which program part to be executed next is repeated until a start command is received, block 38. The start command can, for example, be an approval from the user, an external input signal, a timeout, or detection of an event. In the meantime, the user may move the robot to new positions within the working area of the robot. Execution of the presently selected part of the program is started upon receiving the start command, block 40.

Figure 4:
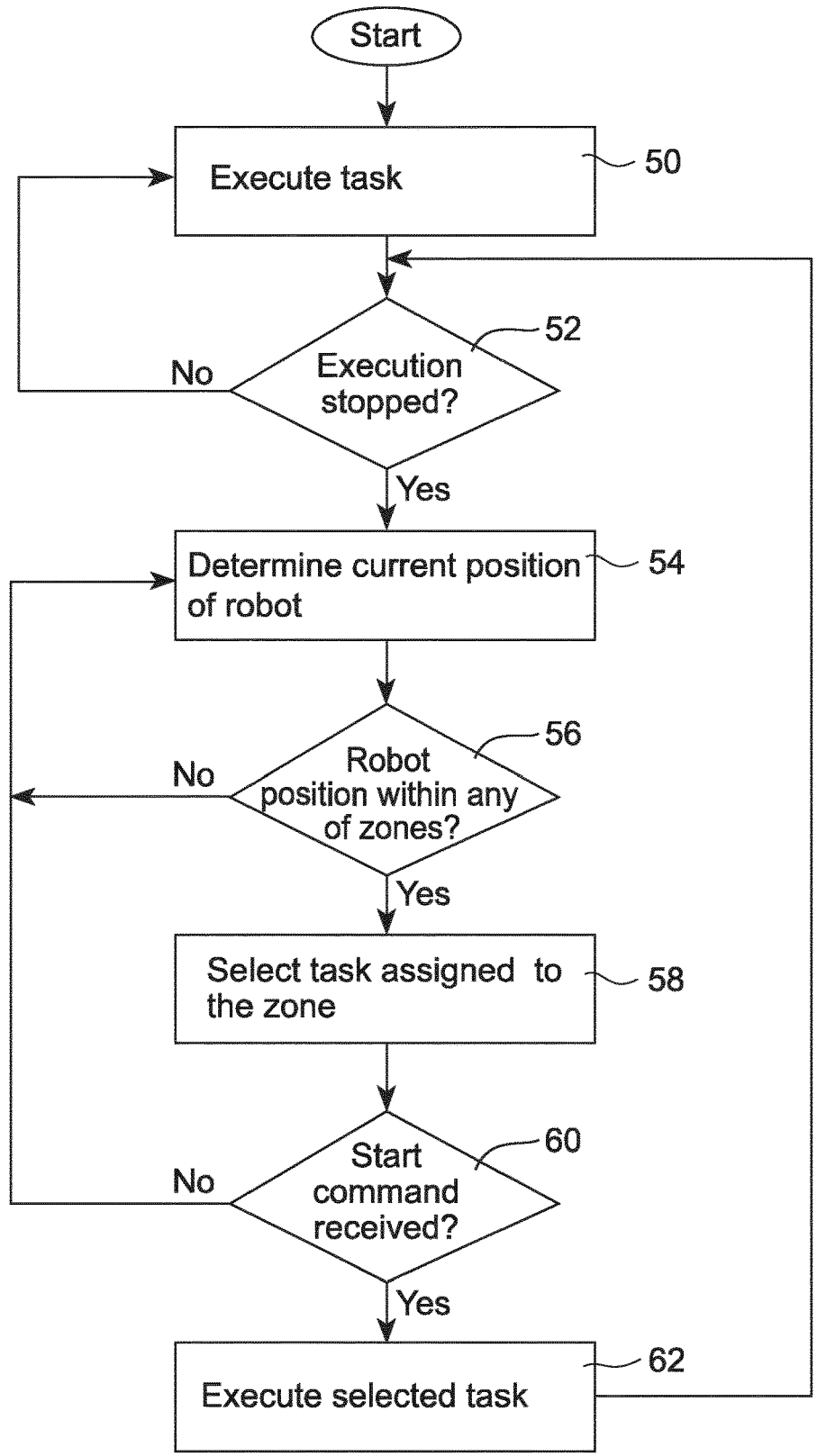
FIG. 4 shows a flow chart of a method according to a second embodiment of the invention.

FIG. 4 shows a flow chart of a method according to a second embodiment of the invention. In this embodiment of the invention, a plurality of zones are defined within the operating range of the robot, and each of the zones is assigned a part of the program code for carrying out a certain task. One of the tasks is executed, block 50. The execution of the task is continued until the execution is stopped, block 52. When the execution of the task has been stopped, the current position of the robot is determined, block 54. The next task to be executed is selected based on the zone within which the current position of the robot is located. This is, for example done by determining whether the current position of the robot is within any of the defined zones, block 56, and if that is the case determine within which of the defined zones the robot is located. For example, it is determined within which of the zones the TCP of the robot is located. The task assigned to the zone, within which the position of the robot is located, is selected, block 58. The selection of which task to be executed next is repeated until a start command is received, block 60. In the meantime, the user may move the robot within the working area of the robot to another zone. Execution of the presently selected task is started upon receiving the start command, block 62.

Figure 5:
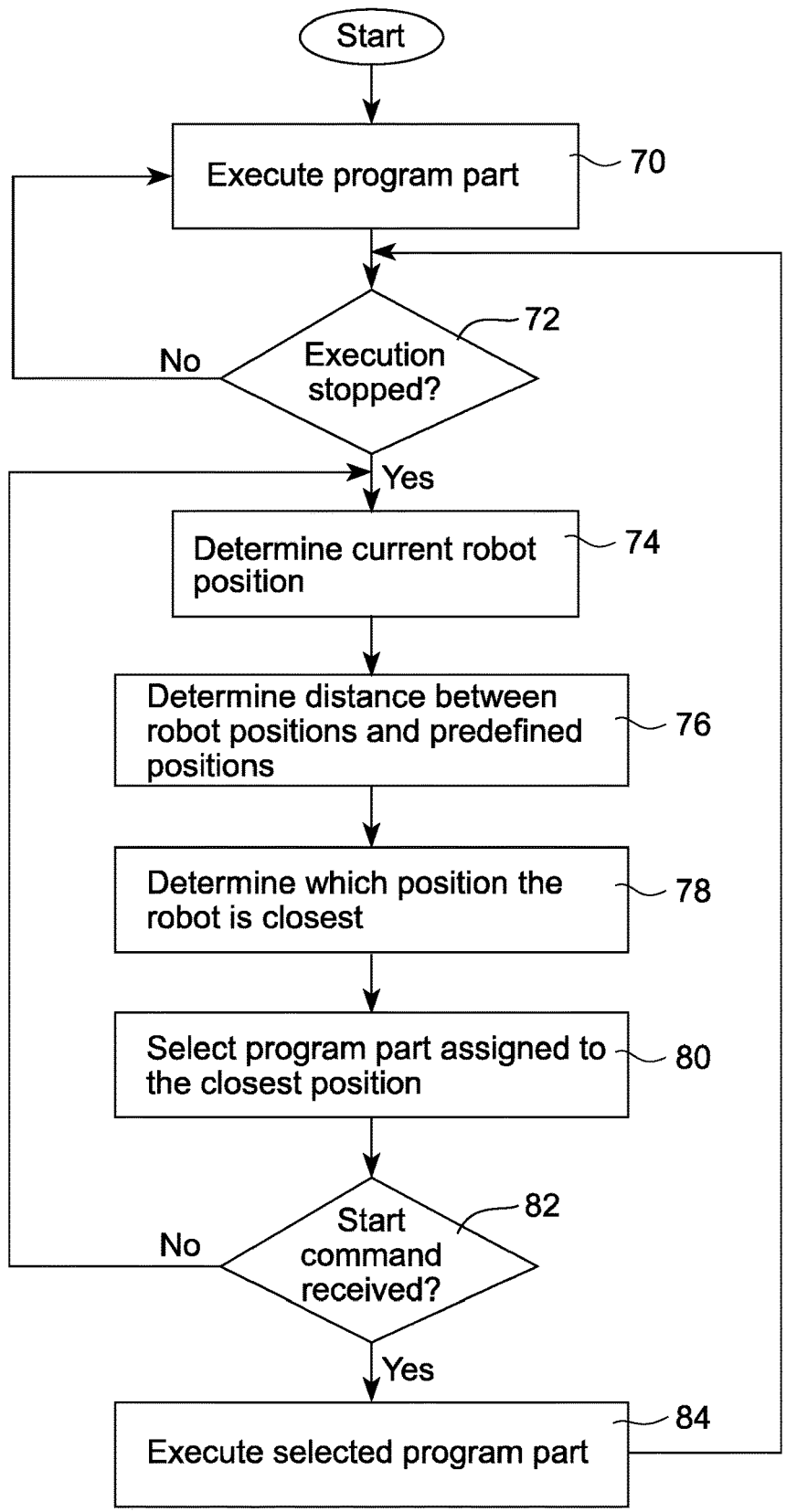
FIG. 5 shows a flow chart of a method according to a third embodiment of the invention.

FIG. 5 shows a flow chart of a method according to a third embodiment of the invention. In this embodiment of the invention, a plurality of points has been defined in the vicinity of the robot, and each of the defined points has been assigned a part of the program code. The method comprises executing a part of the robot program, block 70. Determining whether execution of the program part has been stopped, block 72. When execution of the robot program has been stopped, the current position of the robot is determined, block 74. The distances between the current position of the robot and the defined points are determined, block 76. In a next step it is determined based on the determined distances which of the defined positions the robot is closest, block 78. The part of the program code assigned to the position closest to the current position of the robot is selected, block 80. The selection of which part of the program code to be executed next is repeated until a start command is received, block 82. In the meantime, the user may move the robot to new positions within the working area of the robot. Execution of the presently selected part of the program is started upon receiving the start command, block 84.

Figure 6:
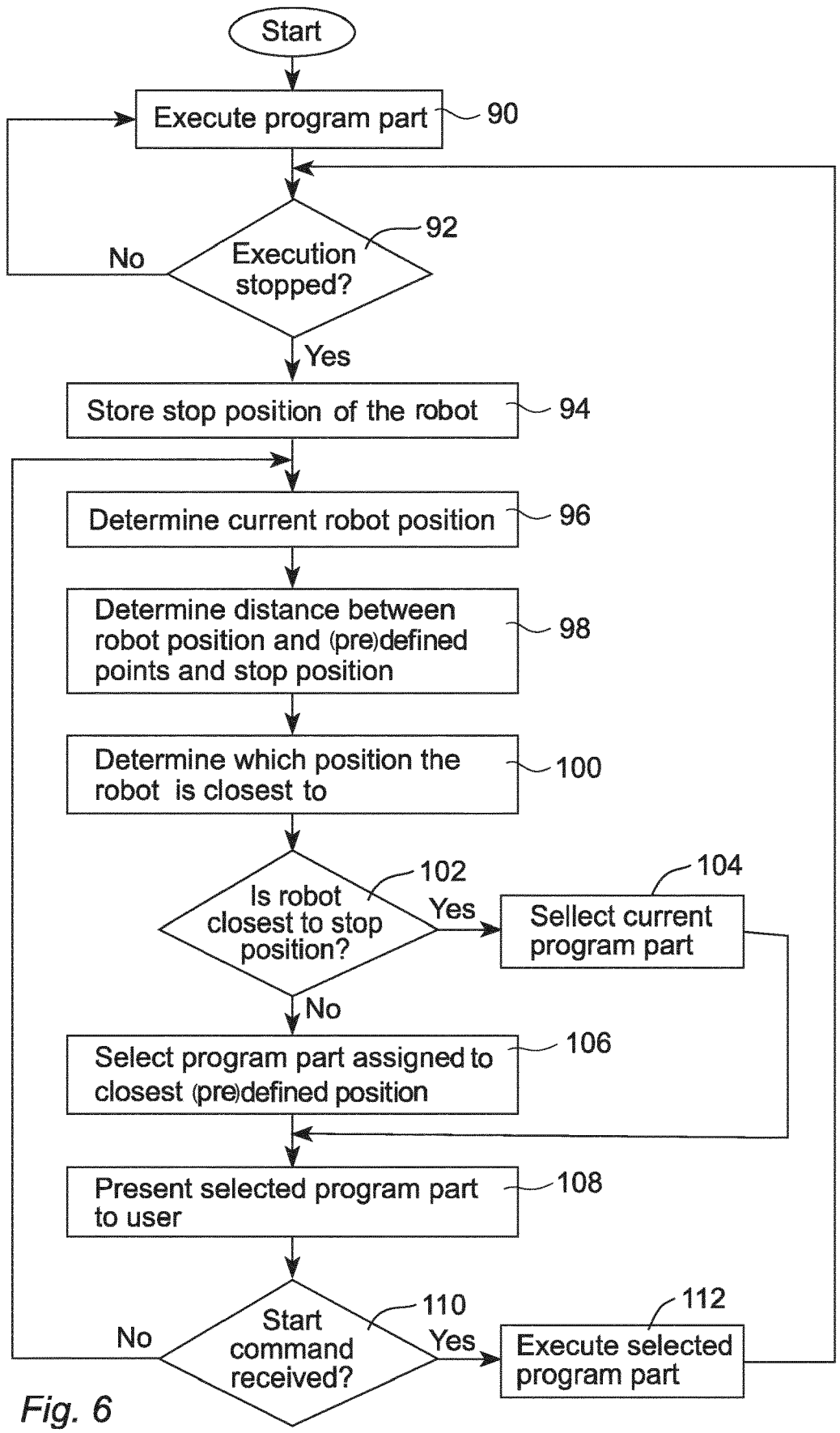
FIG. 6 shows a flow chart of a method according to a fourth embodiment of the invention.

FIG. 6 shows a flow chart of a method according to a fourth embodiment of the invention.

In this embodiment, a plurality of points are defined in the vicinity of the robot. Each of the defined points is assigned a part of the program code. The method comprises executing a part of the robot program, block 90. Determining whether execution of the program part has been stopped, block 92. When execution of the program part has been stopped, the stop position of the robot is determined and stored, block 94. The current position of the robot is determined, block 96. The distances between the current position of the robot and the positions of the defined points are determined, and the distance between the current position of the robot and the stop position is determined, block 98. In a next step it is determined based on the determined distances which of the positions the robot is closest to, block 100. The part of the program code assigned to the position closest to the current position of the robot is selected. If the position of the robot is closest to the stop position, the currently executed part of the program code is selected, block 102 and 104. If the position of the robot is closest to one of the defined points, the program part assigned to the defined point closest to the position of the robot is selected, block 106. The selected program part is presented to the user, block 108. If more than one point is a candidate for being close to the robot position, based on the criteria for what is considered to be closest, the user may be presented with an option to choose from these points. The selection of which part of the program code to be executed next is repeated until a start command is received, block 110. In the meantime, the user may move the robot to new positions within the working area of the robot. When the user agrees to execute the presented program part, he approves the selection, for example, by tapping on the robot. Upon receiving the approval, a start command is generated. Execution of the presently selected part of the program is started upon receiving the start command, block 112.

The invention claimed is:

1. A method for controlling an industrial robot comprising a manipulator and a control unit including program code for causing the robot to perform a plurality of tasks by controlling the motions of the manipulator, wherein the method includes:
    defining a plurality of locations in the surroundings of the robot, each of the locations being assigned a part of the program code,
    determining that the robot has been moved by a user to a new position when execution of the program code has been interrupted,
    automatically selecting which part of the program code is to be executed next based on the closeness between the new position of the manipulator and the defined locations, including automatically selecting which task to be executed next based on the new position, and
    upon command executing the selected part of the program code.

2. The method according to claim 1, wherein the method includes determining the closeness between the new position of the robot and the locations, and selecting the program code assigned to the location based on the closeness to the new position of the robot.

3. The method according to claim 1, wherein the method includes detecting that execution of the program code has been stopped, and upon command executing the selected part of the program code.

4. The method according to claim 1, wherein the method includes presenting the result of the selection on a user interface, and executing the selected part of the program code upon receiving an approval from the user.

5. The method according to claim 1, wherein the method includes deciding whether to continue execution of a current task or to execute another of said tasks based on the new position of the robot.

6. The method according to claim 1, wherein said locations include a plurality of defined points, each of the defined points being assigned a part of the program code, and the method includes:
    determining the closeness between the new position of the robot and the defined points, and
    selecting which part of the program code to be executed next based on the closeness between the new position of the robot and the defined points.

7. The method according to claim 6, wherein the method includes:
    storing a stop position of the robot when execution of the program code has been interrupted, determining the closeness between the new position of the robot and the stop position of the robot, and selecting which part of the program code to be executed next based on the determined closeness between the new position of the robot, the defined points and the stop position such that the currently executed part of the program code is selected if the new position of the robot is closest to the stop position, and otherwise the part of the robot program code assigned to the defined point closest to the new position of the robot is selected.

8. The method according to claim 1, wherein said locations includes a plurality of defined zones within an operating range of the robot, and each of the zones being assigned a part of the program code, and the method includes:

determining whether the new position of the robot is within any of said zones, and selecting which part of the program code to be executed next based on in which of said zones the new position of the robot is located.

9. An industrial robot including:

a manipulator and a robot control unit, wherein the manipulator includes a plurality of joints that are moved under the control of the control unit, and the control unit includes a storage medium including program code for causing the robot to perform a plurality of tasks by controlling the motions of the manipulator when executed by the control unit, wherein a plurality of locations in the surroundings of the robot have been defined, each of the locations being assigned a part of the program code, and wherein the control unit is configured to automatically select which part of the program code is to be executed next based on the closeness between a new position of the manipulator and the defined locations when execution of the program code has been interrupted, including being configured to automatically select which task to be executed next based on the new position, and wherein the control unit is configured to execute the selected part of the program code upon command.

10. The industrial robot according to claim 9, wherein the robot includes a user interface, and the control unit is configured to present the result of the selection on the user interface, and to execute the selected part of the program code upon receiving an approval from the user.

11. The method according to claim 2, wherein the method includes detecting that execution of the program code has been stopped, and upon command executing the selected part of the program code.

12. The method according to claim 2, wherein the method includes presenting the result of the selection on a user interface, and executing the selected part of the program code upon receiving an approval from the user.

13. The method according to claim 2, wherein said locations include a plurality of defined points, each of the defined points being assigned a part of the program code, and the method includes:

determining the closeness between the new position of the robot and the defined points, and selecting which part of the program code to be executed next based on the closeness between the new position of the robot and the defined points.

14. The method according to claim 2, wherein said locations includes a plurality of defined zones within an operating range of the robot, and each of the zones being assigned a part of the program code, and the method includes:

determining whether the new position of the robot is within any of said zones, and selecting which part of the program code to be executed next based on in which of said zones the new position of the robot is located.

* * * * *